July 20, 1926.

H. E. SPEYER 1,593,477

VEHICLE BODY

Filed Sept. 15, 1923

Inventor

Herbert E. Speyer
By Cyrus Kehr
Attorney

July 20, 1926. 1,593,477
H. E. SPEYER
VEHICLE BODY
Filed Sept. 15, 1923 2 Sheets-Sheet 2

Inventor
Herbert E. Speyer
By Cyrus Kehr
Attorney

Patented July 20, 1926.

1,593,477

UNITED STATES PATENT OFFICE.

HERBERT E. SPEYER, OF KNOXVILLE, TENNESSEE, ASSIGNOR TO NATIONAL CONVERTIBLE BODY COMPANY, OF KNOXVILLE, TENNESSEE, A CORPORATION OF TENNESSEE.

VEHICLE BODY.

Application filed September 15, 1923. Serial No. 662,967.

This improvement relates particularly to what are termed convertible vehicle bodies, the vehicle having seats, a part of which may be shifted to adapt the vehicle to modified use.

The object of this invention is to produce a vehicle body having a front seat and a rear seat and having an end gate, the rear seat being adapted to be conveniently moved forward and nested with the front seat in compact form, whereby the space in the vehicle body rearward of the two nested seats is available for receiving freight commodities.

The improvement is especially applicable to automobiles.

In the accompanying drawings.

Figure 1:
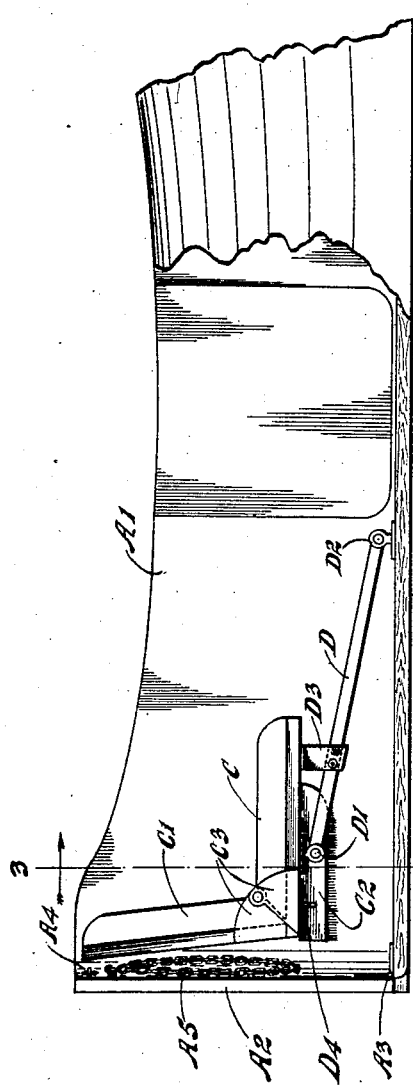
Fig. 1 is a side elevation with the right hand side broken away and showing the rear seat in position at the rear and showing the end gate closed.
Figure 2:
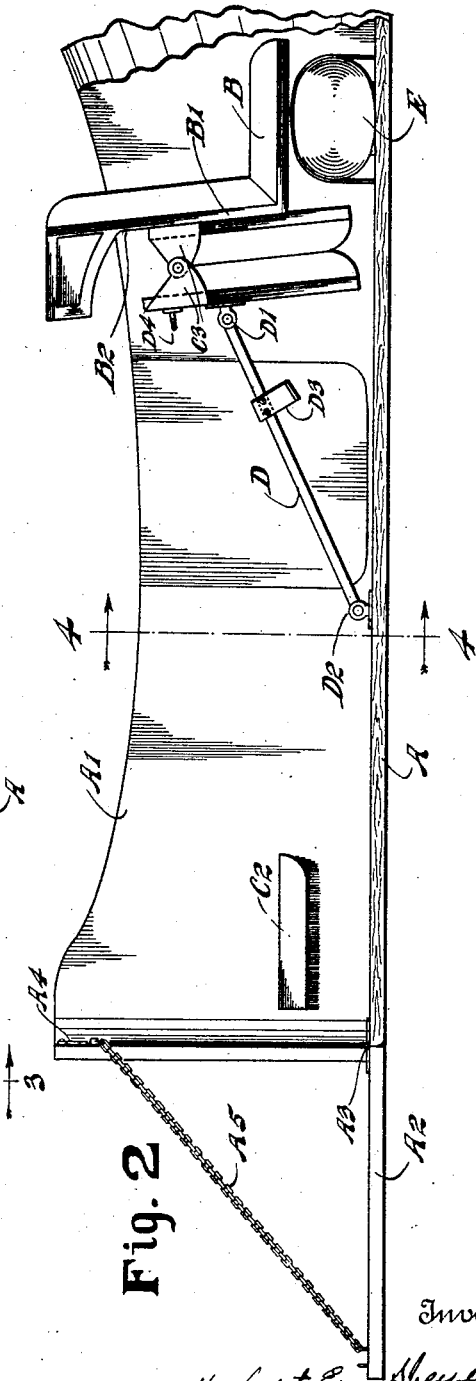
Fig. 2 is a similar view showing the rear seat moved forward and nested with the front seat and showing the end gate open.
Figure 3:
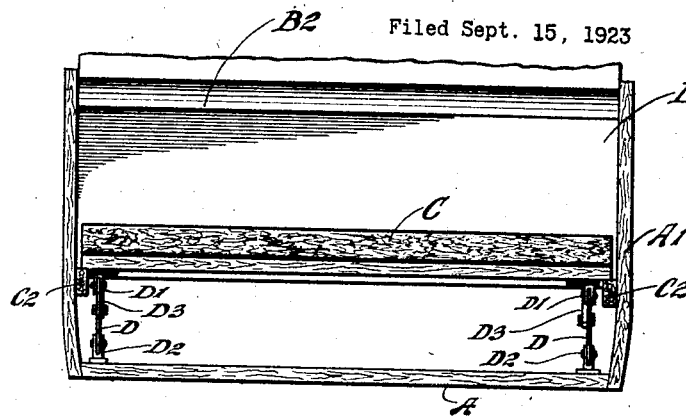
Fig. 3 is an upright section on the line, 3—3, of Fig. 1, looking toward the right.
Figure 4:
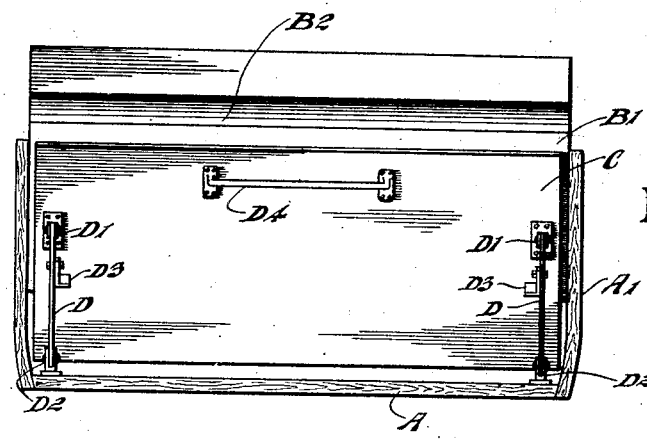
Fig. 4 is an upright section on the line, 4—4, of Fig. 2, looking toward the right.
Figures 5, 6:
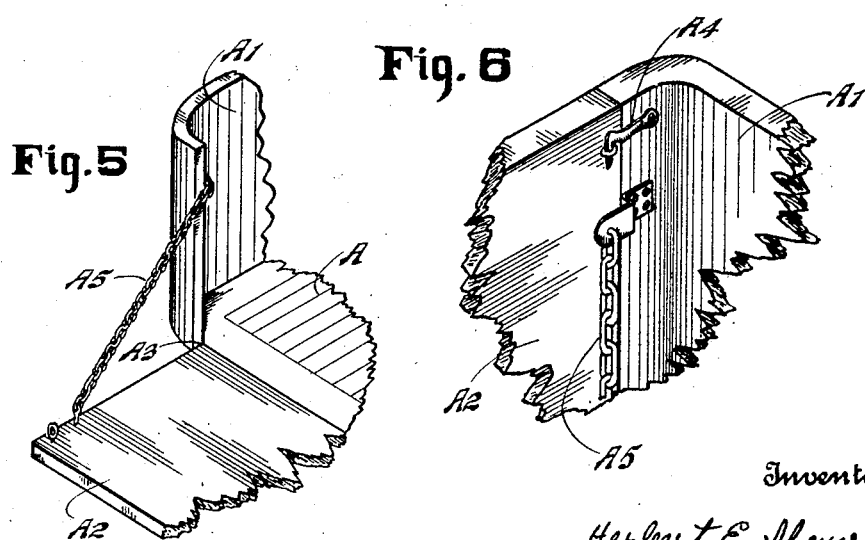
Figs. 5 and 6 are details of means for holding the end gate in the open position and in the closed position.

These drawings show my improved vehicle body in a form suited for placing on a Ford automobile chassis.

Referring to said drawings, A is the floor of the automobile body. $A^1$, $A^1$ are the side walls. $A^2$ is the end gate. The end gate is hinged at $A^3$ to the rear end of the floor. A top, not shown, may be supported above the body in any desired manner. The end gate is held in the closed position by means of a hook, $A^4$, at each upper corner of the end gate. Brace chains, $A^5$, are attached to the ends of the end gate and to the ends of the side wall to hold the end gate in the open or horizontal position.

The front seat, B, is placed in the usual position. The back, $B^1$, at the front seat extends from the floor upward and reaches from one side wall to the other. At the rear the back, $B^1$, is formed with a recess, $B^2$, extending from one wall, $A^1$, to the other and which is to receive the rear seat when the rear part of the automobile body is to be cleared for hauling freight or for other use. The rear seat, C, normally rests on ledges or shoulders, $C^2$, such a ledge being supported on the inner face of each of the side walls, $A^1$. Said ledges reach forward from the rear end of the side wall far enough to receive about two-thirds of the depth of the seat. To the seat, C, is applied a back, $C^1$, having its lower edge joined to the rear edge of the seat by means of hinges, $C^3$, which permit folding the back forward flatwise upon the upper face of the seat.

The forward part of the rear seat is supported at each end by a carrying bar, D, which has its rear end hinged to the seat at $D^1$. The opposite end of each of said bars is hinged at $D^2$ between the front seat and the rear seat, to the vehicle body. The hinges at $D^1$ and $D^2$ are on axes which are horizontal and transverse to the length of the automobile body, whereby the carrying bars, D, are adapted to move in upright planes along the inner faces of the side walls, $A^1$. On each bar, D, under the forward part of the rear seat, C, is a fixed lug, $D^3$, which is of proper height to form a support for the forward part of the seat. This lug also prevents the seat from turning between the bars, D, when the seat has been moved from its rear position.

When the back, $C^1$, has been turned forward to lie flatwise upon the seat, C, said seat and back and the carrying bars, D, may be together moved forward and downward, the bars turning on the hinges, $D^2$. Said hinges are so positioned as to give the bars, D, the right length to deliver the seat, C, and the back, $C^1$, into the recess, $B^2$, at the rear of the front seat back, $B^1$, the rear seat C, and the rear back seat, $C^1$, remaining folded against each other and taking positions parallel to the plane of the front seat back, $B^1$.

On the rear part of the lower face of the rear seat, C, is a handle, $D^4$, which may be used for drawing the rear seat and rear back and the bars, D, away from the front seat rearward into normal or rest position.

When the rear seat is in its rear position, the carrying bars are oblique and serve as braces for preventing forward movement of said seat. When the rear seat is in its forward position, the bars, D, are again oblique and serve as braces to hold the rear seat against the back of the front seat.

The gasoline tank, E, for supplying gasoline to the automobile engine is in the place it usually occupies in the Ford automobile.

I claim as my invention,

1. In a vehicle body, the combination with a floor and side sills, of a stationary front seat and a rear seat, a rear seat back having its lower edge coupled foldably to the rear seat, ledges on the side walls for supporting the rear part of the rear seat, a carrying bar adjacent each side wall and being in operative relation between its ends with the seat to support the front part of the seat and having one end hinged to the rear seat and having its other end hinged to the body between the seats in position to permit said carrying bars to carry the rear seat and rear seat back forward and allow them to nest close to the front seat, substantially as described.

2. In a vehicle body, the combination with a floor and side sills, of a stationary front seat and a rear seat, a rear seat back having its lower edge coupled foldably to the rear seat, ledges on the side walls for supporting the rear part of the rear seat, a carrying bar adjacent each side wall and having one end hinged to the rear seat and having its other end hinged to the body between the seats in position to permit said carrying bars to carry the rear seat and rear seat back forward and allow them to nest close to the front seat, and a lug on each of said carrying bars in position to support the forward part of the rear seat when that seat is in its rear position, substantially as described.

3. In a vehicle body, the combination with a floor and side walls, of a stationary front seat, a rear seat, supports for the rear seat, a handle on the under face of the rear seat, and a carrying bar adjacent each side wall and having one end hinged to the rear seat and having its other end hinged to the body between the seats in position to permit said carrying bars to carry the rear seat forward and allow it to nest close to the front seat, substantially as described.

In testimony whereof I have signed my name, this 8th day of September, in the year one thousand nine hundred and twenty-three.

HERBERT E. SPEYER.